United States Patent
Sanz et al.

(10) Patent No.: US 11,261,352 B2
(45) Date of Patent: Mar. 1, 2022

(54) THIXOTROPIC COMPOSITION THAT CAN BE USED AS AN ANTI-RUNNING AGENT FOR MASTICS

(71) Applicant: BOSTIK SA, Colombes (FR)

(72) Inventors: Federico Sanz, Choisy Au Bac (FR); Lars Thilander, Helsingborg (SE); Patrick Verneaut, Brionne (FR)

(73) Assignee: BOSTIK SA, Colombes (FR)

( * ) Notice: Subject to any disclaimer, the term of this patent is extended or adjusted under 35 U.S.C. 154(b) by 240 days.

(21) Appl. No.: 16/494,106

(22) PCT Filed: Mar. 13, 2018

(86) PCT No.: PCT/FR2018/050584
§ 371 (c)(1),
(2) Date: Sep. 13, 2019

(87) PCT Pub. No.: WO2018/172651
PCT Pub. Date: Sep. 27, 2018

(65) Prior Publication Data
US 2021/0130660 A1    May 6, 2021

(30) Foreign Application Priority Data
Mar. 14, 2017 (FR) .......... 1752054

(51) Int. Cl.
| | |
|---|---|
| *C09J 11/06* | (2006.01) |
| *C08K 5/21* | (2006.01) |
| *C09J 175/04* | (2006.01) |
| *B01J 13/00* | (2006.01) |

(52) U.S. Cl.
CPC .......... *C09J 11/06* (2013.01); *B01J 13/0082* (2013.01); *C08K 5/21* (2013.01); *C09J 175/04* (2013.01)

(58) Field of Classification Search
CPC . C08K 5/21; C09J 175/04–16; C10M 105/38; C10M 115/08
See application file for complete search history.

(56) References Cited

U.S. PATENT DOCUMENTS

| | | |
|---|---|---|
| 6,221,998 B1 | 4/2001 | Okuhira et al. |
| 6,271,333 B1 * | 8/2001 | Okuhira .......... C08G 18/765 528/28 |
| 6,548,593 B2 | 4/2003 | Merz et al. |
| 2009/0092840 A1 * | 4/2009 | Schlumpf .......... C09J 175/04 428/423.1 |
| 2014/0142012 A1 * | 5/2014 | Mizuki .......... C10M 105/38 508/391 |

FOREIGN PATENT DOCUMENTS

| | | | | |
|---|---|---|---|---|
| CA | 536837 A | * | 2/1957 | |
| EP | 0985693 A1 | | 3/2000 | |
| EP | 1046676 A1 | | 10/2000 | |
| JP | 02197302 A | * | 8/1990 | ...... B21B 1/22 |
| JP | 2013035946 A | * | 2/2013 | |
| WO | WO-2018203542 A1 | * | 11/2018 | ...... C10M 169/02 |

OTHER PUBLICATIONS

Machine Translation of WO2018203542A1. Nov. 8, 2018. (Year: 2018).*
Application JP2017-091401. Filed May 1, 2017. (Year: 2017).*
Machine Translation of Application JP2017-091401. Filed May 1, 2017. (Year: 2017).*
Machine Translation of JP2013-035946A. Feb. 21, 2013. (Year: 2013).*
Machine Translation of JPH02-197302A. Aug. 3, 1990. (Year: 1990).*
Partial Written Translation of JPH02-197302A. Aug. 3, 1990. (Year: 1990).*
International Search Report for PCT/FR2018/050584 dated May 16, 2018.

* cited by examiner

*Primary Examiner* — Stephen E Rieth
(74) *Attorney, Agent, or Firm* — Millen, White, Zelano and Branigan, P.C.; Harry B. Shubin

(57) ABSTRACT

An adhesive sealant composition of at least one moisture-crosslinkable prepolymer and an anti-sagging agent of 5% to 30% by weight of a thixotropic composition of 10% to 40% by weight of a bisurea a) obtained by reaction of a primary aliphatic amine a1) with a diisocyanate a2) having a molar mass of less than 500 g/mol, and 60% to 90% by weight of an ester b) of formula (I):

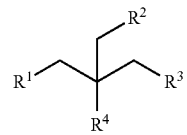

in which $R^1$, $R^2$ and $R^3$ are an oxycarbonylalkyl radical having from 4 to 20 carbon atoms, $R^4$ is hydrogen, methyl or ethyl or —$CH_2$—$R^5$ in which $R^5$ is oxycarbonylalkyl having from 4 to 20 carbon atoms, in the form of a suspension of solid particles of bisurea a) in a continuous phase formed by ester b).

12 Claims, No Drawings

THIXOTROPIC COMPOSITION THAT CAN BE USED AS AN ANTI-RUNNING AGENT FOR MASTICS

The present invention relates to a thixotropic composition that can be used as anti-sagging agent for sealants, preferably for single-component sealants, used in the construction field. It also relates to an adhesive sealant composition, comprising said thixotropic composition.

Sealants are widely used in the construction field, in particular to assemble substrates, for example made of concrete or steel, via expansion joints and to make it possible, by virtue of their mechanical and in particular elastic properties, to obtain a joint which is stable with respect to the dimensional variations brought about by changes in temperature.

Generally packaged, for the purpose of manual use, in cartridges provided with a nozzle at one end, single-component sealants are applied after having placed said cartridge in a gun. The handling by the operator of the trigger of the gun actuates a piston which extrudes the sealant through the nozzle and introduces it into the gap between the two substrates to be assembled, for the jointing thereof.

Single-component sealant compositions comprise a moisture-crosslinkable prepolymer, the chemical structure of which is provided with generally terminal, isocyanate or alkoxysilane reactive groups. The reaction of these reactive groups with the water originating from the moisture from the air or from the substrate (known as crosslinking reaction) enables, after the introduction of the sealant into the gap between the two substrates to be assembled, the creation of a solid three-dimensional polymeric network which confers the desired mechanical properties on the adhesive joint thus created. These mechanical properties are effectively obtained when all of the amount of sealant introduced is crosslinked, which may require several days.

In the case of two-component sealants, a first composition, analogous to that of a single-component sealant, is combined with a second composition which comprises a crosslinking agent, for example of amine type. The two compositions are mixed at the time of the application by a suitable device, and also extruded by the operator through a nozzle into the gap between the two substrates to be assembled.

Immediately after the gap between the two substrates has been filled by the sealant extruded by the operator, the crosslinking reaction begins at the surface of the sealant, and after a variable time period ranging from 3 minutes to 2 hours, a membrane (or skin) formed of crosslinked sealant forms on said surface. While this membrane is not formed, the sealant may exhibit a risk of sagging (also referred to as slump) under the effect of gravity, since the gap to be jointed is very generally placed in a vertical plane.

Such sagging or slump results, after total completion of the crosslinking reaction, in a joint that has a lack of flatness and of dimensional homogeneity which is seriously detrimental to its mechanical properties.

In order to prevent such a risk, the sealant compositions, in two-component or single-component form, generally comprise a thixotropic organic agent based on a derivative of diurea (or bisurea) type.

U.S. Pat. No. 6,548,593 describe such a thixotropic agent, in which the bisurea is obtained by reaction of an aromatic diisocyanate with an aliphatic amine Each of these compounds reacts in the form of a solution in a same inert carrier, such as plasticizer, and the bisurea, resulting from the reaction, is obtained in the form of solid particles dispersed in said inert carrier, the assembly thus constituting a suspension that has the consistency of a gel.

The only plasticizer mentioned by this patent, as inert carrier, is diisodecyl phthalate (also known under the abbreviation DIDP). In point of fact, it is well known that phthalates can be dangerous to man, since some of them have been classified by the European Chemicals Agency as carcinogenic, mutagenic or reprotoxic (CMR) substances. Consequently, it is highly desirable, for public health purposes, to limit exposure to phthalates or even to replace them by safer substances, in all the industrial products in which they are used and to which the consumer and/or the manufacturer are liable to be exposed.

Furthermore, the plasticizers employed in sealants can exhibit the disadvantage of migrating (or diffusing) out of the crosslinked sealant, which can have several undesirable consequences at the adhesive joint: an unattractive appearance related to the presence of stains at the surface of the substrates in contact with said joint, a loss of elasticity which risks bringing about failure in the bulk thereof (or cohesive failure), or else failure at the interface between the joint and the substrate (adhesive failure).

One objective of the present invention is to provide a thixotropic composition that can be used as anti-sagging agent for sealants, in particular for single-component sealants, that are phthalate-free.

Another objective of the present invention is to provide such a thixotropic composition comprising, as inert carrier, a plasticizer which, as component of a sealant, in particular a single-component sealant, does not migrate out of the crosslinked sealant.

Another objective of the present invention is to provide such an adhesive or sealant composition, resulting in a crosslinked joint which has mechanical properties of the same level as those obtained using DIDP.

Another objective of the present invention is to provide a sealant composition resulting in a crosslinked joint which exhibits improved mechanical properties with respect to those obtained using DIDP, in particular in terms of elasticity.

It has now been found that these objectives can be achieved, completely or in part, by means of the thixotropic composition and of the adhesive sealant composition comprising same, which are subjects of the present invention, which are described below.

The present invention therefore relates firstly to a thixotropic composition comprising, on the basis of the total weight of said composition:
  from 10% to 40% by weight of a bisurea a) obtained by reaction of a primary aliphatic amine a1) with a diisocyanate a2) having a molar mass of less than 500 g/mol, and
  from 60% to 90% by weight of an ester b) of formula (I):

in which:
  $R^1$, $R^2$ and $R^3$, which are identical or different, each represent an oxycarbonylalkyl (in other words: —O—C(O)-alkyl) radical having from 4 to 20 carbon atoms;

$R^4$ represents a hydrogen atom, a methyl or ethyl radical or else a radical: —CH$_2$—R$^5$ in which R$^5$ represents an oxycarbonylalkyl radical having from 4 to 20 carbon atoms;

said composition being in the form of a suspension (or dispersion) of solid particles of bisurea a) in a continuous phase formed by the ester b).

The incorporation of said thixotropic composition in a sealant composition, in particular a single-component sealant composition, based on a moisture-crosslinkable prepolymer, advantageously makes it possible to limit, or even to eliminate, the undesirable effect of sagging of the non-crosslinked sealant at the surface, without however limiting the ability of said sealant to be extruded from the application cartridge. The incorporation of said thixotropic composition in said sealant also makes it possible, after crosslinking, to obtain an adhesive joint that has the required, and even improved, mechanical properties, without the drawback of diffusion (or migration) of the plasticizer.

According to one embodiment, the thixotropic composition according to the invention consists, on the basis of the total weight of said composition:

of 10% to 40% by weight of the bisurea a), and
of 60% to 90% by weight of the ester b).

The thixotropic composition according to the invention comprises a bisurea a) obtained by reaction of a primary aliphatic amine a1) with a diisocyanate a2) having a molar mass of less than 500 g/mol.

The chosen amine is preferably an n-alkylamine comprising from 1 to 22 carbon atoms and, even more preferably, n-butylamine.

The diisocyanate a2) that can be used may be aromatic or aliphatic, and has the formula (II):

NCO—R$^6$—NCO           (II)

in which $R^6$ is chosen from one of the following divalent radicals, the formulae of which below show the 2 free valencies:

a) the divalent radical derived from isophorone:

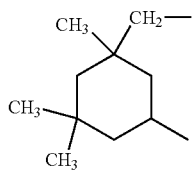

b) the divalent radical 4,4'-methylene-bis(cyclohexyl)

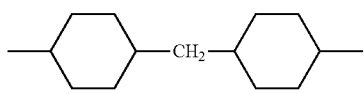

c) the divalent radical derived from toluene 2,4-diisocyanate (or 2,4-TDI) or from toluene 2,6-diisocyanate (or 2,6-TDI) of respective formulae:

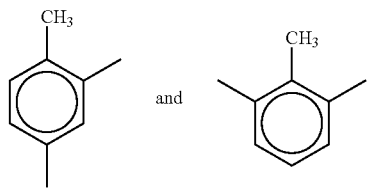

d) the divalent radical derived from 4,2'-diphenylmethylene diisocyanate (or 4,2'-MDI) or from 4,4'-diphenylmethylene diisocyanate (or 4,4'-MDI), of formulae:

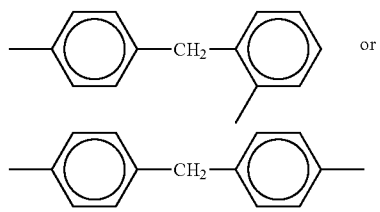

e)
—(CH$_2$)$_6$— (or hexamethylene radical);
f)

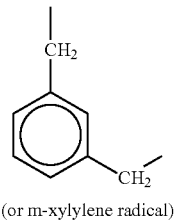

(or m-xylylene radical)

g)

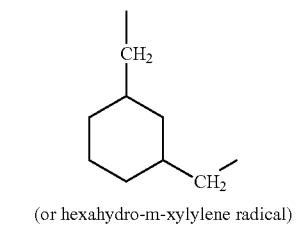

(or hexahydro-m-xylylene radical)

4,4'-Diphenylmethylene diisocyanate (or 4,4'-MDI), corresponding to one of the formulae d) above, is particularly preferred.

The ester b) of general formula (I) is obtained by reaction of a monocarboxylic acid with a polyol, which is:
pentaerythritol, of formula:

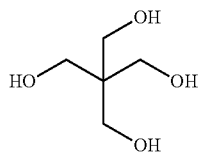

when $R^4$ represents a radical: —CH$_2$—R$^5$;

trimethylolpropane, of formula:

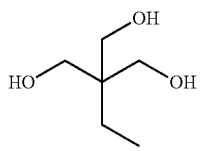

when $R^4$ represents the ethyl radical;
trimethylolethane, of formula:

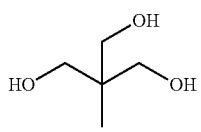

when $R^4$ represents the methyl radical; or else trimethylolmethane, of formula:

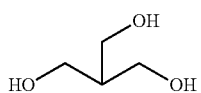

when $R^4$ represents a hydrogen atom.

Butyric acid (also known as n-butanoic acid) or valeric acid (also known as n-pentanoic acid) are preferably employed. Reference is made to application WO 2012/026861 for fuller details regarding the preparation of the ester b).

According to a preferred embodiment, the ester b) has the general formula (I), in which $R^4$ represents a radical: —$CH_2$—$R^5$.

According to a more preferred embodiment, the ester b) has the general formula (I), in which:
 $R^1$, $R^2$ and $R^3$ are identical and each represent an oxycarbonylalkyl radical having 4 or 5 carbon atoms; and
 $R^4$ represents a radical: —$CH_2$—$R^5$ in which $R^5$ is identical to $R^1$, $R^2$ and $R^3$.

A particularly preferred ester b) is pentaerythritol tetravalerate, corresponding to the formula (I) in which $R^1$, $R^2$, $R^3$ and $R^4$ each represent the radical:

—O—C(O)-n$C_4H_9$ and which is sold under the trade name Pevalen™ by Perstorp.

The thixotropic composition according to the invention may be prepared in the following manner The reaction of the aliphatic amine a1) with the diisocyanate a2) is highly exothermic. To prevent the large amount of heat formed by the reaction from leading to the decomposition of the bisurea formed, the compounds a1) and a2) are each dissolved in the ester b), prior to the reacting thereof, said ester b) thus being used to discharge the heat formed by the reaction. The two solutions in the ester b) of the compounds a1) and a2) are advantageously each introduced into a reactor via injectors, under a pressure of 40 to 200 bar, preferably 80 to 120 bar, the two solutions thus being brought into contact in the sprayed liquid state. The amounts of reactants preferably correspond to a (number of moles of a1)/(number of moles of a2) ratio equal to around 2. The bisurea is produced by the reaction in the form of solid particles dispersed in a continuous phase of diester b), the Brookfield viscosity of the corresponding suspension, measured at the temperature of 23° C. being generally between 1 and 50 Pa·s, preferably between 10 and 25 Pa·s.

Another subject of the present invention is an adhesive sealant composition comprising at least one moisture-crosslinkable prepolymer and, as anti-sagging agent, from 5% to 30% by weight, on the basis of the total weight of said composition, of the thixotropic composition according to the invention, as defined previously.

According to a preferred variant, the adhesive sealant composition is a single-component sealant composition.

Said adhesive sealant composition comprises, according to one embodiment:
 from 10% to 30% by weight of at least one moisture-crosslinkable prepolymer,
 from 20% to 70% by weight of at least one filler,
 from 5% to 25% by weight of the thixotropic composition, and
 from 0.01% to 1% by weight of at least one crosslinking catalyst,
the percentages by weight being expressed with respect to the total weight of the adhesive sealant composition.

Said sealant composition has the advantage of not exhibiting a risk of sagging (or slump) under the effect of gravity, when it is used for jointing a gap between the two substrates to be assembled which lies in a vertical plane, without the adhesive joint thus formed being subject to the drawback of migration or diffusion. Said adhesive joint also has the required mechanical properties, and even an improved elasticity.

According to a preferred embodiment, the adhesive sealant composition can comprise, for example, with respect to the total weight of the adhesive sealant composition:
 from 15% to 25% by weight of at least one moisture-crosslinkable prepolymer,
 from 40% to 70% by weight of filler,
 from 10% to 20% by weight of the thixotropic composition, and
 from 0.01% to 1% by weight of crosslinking catalyst.

Moisture-Crosslinkable Prepolymer:

The moisture-crosslinkable prepolymer is chosen from:
(i) a polyurethane comprising —NCO end groups, or
(ii) a prepolymer comprising alkoxysilyl end groups.

The polyurethanes comprising —NCO end groups are prepared, in a well-known manner, by reacting:
 a diisocyanate compound, for example chosen from diphenylmethane diisocyanate (MDI), toluene diisocyanate (TDI), isophorone diisocyanate (IPDI), xylylene diisocyanate (XDI) or hexamethylene diisocyanate (HDI), with
 a polyol or composition of polyols having a number-average molar mass ranging from 1000 to 18 000 g/mol, preferably one or more polyethers, and more preferably at least one polyether triol.

The polyurethane prepolymers comprising —NCO end groups react during the crosslinking reaction with the moisture, forming bonds of urea type which ensure the creation of a solid three-dimensional polymeric network constituting the adhesive joint.

The prepolymers comprising alkoxysilyl end groups comprise at least two alkoxysilyl end groups of formula (III):

$$—Si(R^7)_p(OR^8)_{3-p} \quad (III)$$

in which:
 $R^7$ and $R^8$, which are identical or different, each represent a linear or branched alkyl radical comprising from 1 to 4 carbon atoms, with the possibility, when there are several $R^7$ (or $R^8$) radicals, that the latter are identical or different;

p is an integer equal to 0, 1 or 2.

Mention may be made, as examples of such alkoxysilyl groups, of the groups:

—Si(CH$_3$)(OCH$_3$)$_2$; —Si(OCH$_3$)$_3$; —Si(CH$_3$)(OEt)$_2$; —Si(OEt)$_3$.

The alkoxysilyl end groups are connected, directly or indirectly, to a main chain of polyether, polyester or polyurethane type.

The prepolymers comprising alkoxysilyl end groups react during the crosslinking reaction with the moisture, forming bonds of siloxane type which ensure the creation of a solid three-dimensional polymeric network constituting the adhesive joint.

These prepolymers are also available commercially, for example from Kaneka, Wacker or else Momentive.

According to a preferred variant, the moisture-crosslinkable prepolymer is a polyurethane comprising —NCO end groups.

Filler:

The filler(s) which can be used in the adhesive sealant composition according to the invention can be chosen from inorganic fillers and mixtures of organic fillers and of inorganic fillers.

Use may be made, as examples of inorganic filler(s) which can be used, of any inorganic filler(s) usually used in the field of sealant compositions. These fillers are in the form of particles of varied geometry. They can, for example, be spherical or fibrous or have an irregular shape.

Preferably, use is made of clay, quartz or carbonate fillers.

More preferably, use is made of carbonate fillers, such as alkali metal or alkaline earth metal carbonates, and more preferably calcium carbonate or chalk.

These fillers can be untreated or treated, for example using an organic acid, such as stearic acid, or a mixture of organic acids predominantly consisting of stearic acid.

Use may also be made of hollow inorganic microspheres, such as hollow glass microspheres, and more particularly those made of calcium sodium borosilicate or of aluminosilicate.

The amount of inorganic filler which can be used can in particular vary from 20% to 65% by weight, preferably from 20% to 50% by weight and more preferably from 25% to 40% by weight, on the basis of the weight of the adhesive sealant composition according to the invention.

Use may be made, as examples of organic filler(s) which can be used, of any organic filler(s) and in particular polymeric filler(s) usually used in the field of sealant compositions.

Use may be made, for example, of polyvinyl chloride (PVC), polyolefins, rubber, ethylene-vinyl acetate (EVA), or aramid fibres such as Kevlar®.

Use may also be made of hollow microspheres made of expandable or non-expandable thermoplastic polymer. Mention may in particular be made of hollow microspheres made of vinylidene chloride/acrylonitrile.

Preferably, use is made of PVC.

The mean particle size of the filler(s) which can be used is preferably less than or equal to 10 microns, more preferably less than or equal to 3 microns, in order to prevent them from settling in the adhesive sealant composition according to the invention during its storage.

The mean particle size is measured for a volume particle size distribution corresponding to 50% by volume of the sample of particles analysed. When the particles are spherical, the mean particle size corresponds to the median diameter (D50 or Dv50), which corresponds to the diameter such that 50% of the particles by volume have a size smaller than said diameter. In the present patent application, this value is expressed in micrometres and determined according to standard NF ISO 13320-1 (1999) by laser diffraction on an appliance of Malvern type.

Crosslinking Catalyst:

Use may be made, as crosslinking catalyst(s) which can be used in the adhesive sealant composition according to the invention, of any catalyst(s) known to a person skilled in the art for catalysing the crosslinking of the NCO-terminated polyurethane or of alkoxysilyl-terminated polymer in the presence of water (or moisture). The water or the moisture may be supplied by the surface of the support or the surrounding environment, in a natural manner (atmospheric moisture) or a controlled manner (for example in a temperature-controlled chamber at a relative humidity of between 40% and 70% at 23° C., or an oven ranging up to 150° C.) in contact with the composition according to the invention. This crosslinking is expressed by the creation, between the polymeric chains of the polyurethane, of bonds of urea type which result in the formation of a three-dimensional polymeric network.

Use may be made, for example, of one or more crosslinking catalysts chosen from dioctyltin dilaurate (DOTL), bismuth-based catalysts or else tertiary amine catalysts, such as:

-1,8-diazabicyclo[5.4.0]undec-7-ene (DBU):

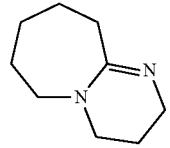

-1,5-diazabicyclo[4.3.0]non-5-ene (DBN):

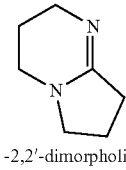

-2,2'-dimorpholinodiethyl ether (DMDEE):

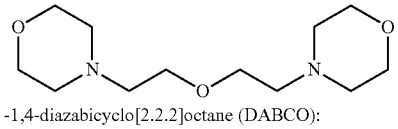

-1,4-diazabicyclo[2.2.2]octane (DABCO):

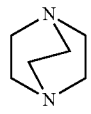

These crosslinking catalysts have the advantage of not being carcinogenic, mutagenic or reprotoxic (CMR).

Preferably, the amount of crosslinking catalyst which can be used ranges from 0.05% to 0.5% by weight, with respect to the weight of the adhesive sealant composition according to the invention.

Plasticizer:

According to a preferred embodiment of the invention, the adhesive sealant composition may comprise at least one plasticizer in a proportion of from 5% to 35% by weight, preferably from 15% to 30% by weight, on the basis of the weight of the adhesive sealant composition according to the invention. The plasticizer makes it possible to increase the plasticity of the composition and to decrease its viscosity, in particular enabling, at the time of the application of the sealant packaged in a cartridge, the easy flow thereof via extrusion at the nozzle. The plasticizer also makes it possible, during the application, to improve the ability of the sealant to spread out or to wet the surface of the substrates to be jointed.

As an example of a plasticizer that can be used, use may be made of any plasticizer customarily used in the field of adhesive, sealant and/or surface-coating compositions.

Use is preferably made of:
an alkylsulfonic acid ester of phenol, as sold under the name Mesamoll® by Lanxess
diisononyl 1,2-cyclohexanedicarboxylate, as sold under the name Hexamoll Dinch® by BASF.

According to one particularly advantageous embodiment, as plasticizer, the ester b) of formula (I) defined previously, and more preferably still pentaerythritol tetravalerate sold under the trade name Pevalen™ by Perstorp, is chosen.

The adhesive sealant composition according to the invention may also comprise at least one adjuvant chosen from adhesion promoters, such as epoxysilanes, UV stabilizers (or antioxidants), pigments, dyes and the mixture thereof. When these adjuvants are present in the composition, the total sum of their content is preferably less than or equal to 15% by weight, with respect to the total weight of the adhesive sealant composition according to the invention.

The adhesive sealant composition according to the invention may be prepared according to a process which comprises a step in which the ingredients are mixed at a temperature below or equal to 50° C., preferably ranging from 5 to 45° C., and better still ranging from 20 to 30° C., under anhydrous conditions. To this end, use may be made of a dispersion mixer for high-viscosity products, such as for example those sold by Wilhelm Niemann.

The adhesive sealant composition according to the invention is preferably stored in an anhydrous environment, for example in a hermetic packaging where the adhesive sealant composition is protected from moisture and preferably protected from light.

The present invention also relates to a ready-to-use article or packaging, comprising the adhesive sealant composition according to the invention in a hermetic packaging protected from air, in particular protected from ambient moisture. Preferably, the hermetic packaging also makes it possible to protect the composition from light. For example, the hermetic packaging can be an aluminium bag or an aluminium cartridge provided with a cap.

The following examples are given purely by way of illustration of the invention and should not be interpreted in order to limit the scope thereof.

Example A (reference): thixotropic composition consisting of a 23.3% weight/weight suspension of bisurea in DIDP
Prepared firstly are:
a solution A of n-butylamine in DIDP, consisting of 17.17% weight/weight of n-butylamine and of 82.83% weight/weight of DIDP, then
a solution B of 4,4'-MDI in DIDP, consisting of 29.46% weight/weight of 4,4'-MDI and of 70.34% weight/weight of DIDP.

The two solutions A and B are heated to 100° C. and then introduced, each under a pressure of 100 bar, into a reactor, in which they are sprayed continuously over one another in a ratio A/B=50.1/49.9 by weight, corresponding to an n-butylamine/MDI molar ratio equal to 2. The reaction is immediate and the temperature of the reactor reaches 140° C. at the end of manufacture.

At the reactor outlet, a stable 23.3% weight/weight dispersion of a bisurea in DIDP is obtained, the bisurea being of formula:

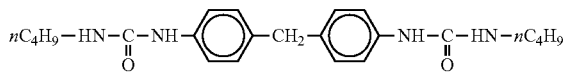

The Brookfield viscosity of the suspension, measured at 23° C., is 15 Pa·s.

Example B (reference): adhesive sealant composition based on polyurethane prepolymer comprising —NCO end groups comprising the thixotropic composition of Example A The following sealant composition, in which the percentages are weight/weight percentages, is prepared by simple mixing of the ingredients:
17% of polyurethane comprising —NCO end groups obtained by reaction of a mixture of 80% by weight of tolylene 2,4-diisocyanate and 20% by weight of tolylene 2,6-diisocyanate with a mixture of a polyether diol with a molar mass of 2000 g/mol and of polyether triol with a molar mass of 4200 g/mol,
25% of carbonate filler,
20% by weight of PVC,
15% by weight of the thixotropic composition of Example A,
10% by weight of DIDP as plasticizer,
8% by weight of xylene,
5% by weight of other additives, including the crosslinking catalyst.

The polyurethane was introduced into the composition in the form of a solution in xylene.

The sealant composition obtained is packaged in an aluminium cartridge, provided with a nozzle, for the purpose of its application by means of a gun for the tests described below.

B.1. Test on the Migration of the Plasticizer:
This test is a good indicator of the migration of the plasticizer out of the crosslinked sealant.

A mass of 1 g of sealant, in the approximate shape of a sphere, is deposited, by means of the cartridge containing the composition of Example B, at the centre of a 1$^{st}$ square glass sheet with a side length of 5 cm, which was placed horizontally beforehand.

A 2$^{nd}$ glass sheet identical to the 1$^{st}$ is subsequently strongly applied to said mass of sealant and by means of a manual pressure, so as to superimpose the two sheets and to thus spread the sealant in the approximate shape of a disc with a diameter of approximately 4.5 cm.

There is then observed, through the upper glass sheet, the appearance of a transparent liquid exuded by the compressed disc of sealant, in the form of a ring surrounding said disc, with an annular radius of between 1 and 2 mm.

B.2. Test on the Flow of the Non-Crosslinked Sealant after Extrusion:
The aim of this test is to assess the extrudability, through the nozzle, of the cartridge-packaged sealant, under the effect of the pressure exerted by the piston, which is integral with the trigger of the gun actuated by the operator.

With this aim, the sealant is extruded under air pressure through a calibrated nozzle and the weight discharged over one minute is measured.

The sealant to be tested is placed in a cylinder-shaped cup (diameter of 24 mm) terminated by an extrusion nozzle with a diameter of 4 mm and a length of 22.5 mm, and a pressure of 3 bar is exerted on the sealant by means of a suitable appliance, the operation being carried out in a climate-controlled chamber at ambient temperature (23° C.).

The flow rate measured is shown in g/minute in the Table below and corresponds to a perfectly compliant sealant behaviour.

B.3. Test On the Tensile Strength Properties of an Adhesive Joint Formed by the Crosslinked Sealant and Uniting Two Substrates This test is carried out for an adhesive joint uniting two concrete substrates and also for an adhesive joint uniting two aluminium substrates.

The two concrete substrates intended to be jointed are two identical substrates of parallelepipedal shape, having a length of 75 mm, a width of 12 mm and a height of 6 mm, the rectangular face of each substrate intended to be in contact with the joint having a length of 75 mm and a height of 12 mm.

The two aluminium substrates intended to be jointed are two identical substrates of parallelepipedal shape, having a length of 75 mm, a width of 25 mm and a height of 12 mm, the two rectangular faces intended to be in contact with the joint having a length of 75 mm and a height of 12 mm.

B.3.1 Preparation of the Specimens of Joints to be Tested:

The concrete (or aluminium) joints to be tested are prepared using the sealant of Example B, so that the crosslinked sealant joint which bonds the two substrates is centred on the corresponding rectangular faces, and has a parallelepipedal shape with a length of 50 mm, a width of 12 mm and a height of 12 mm.

The details relating to the shape of the adhesive joint specimens and their preparation are given in European Standard EN 8339 (cf. § 6 and 7). In particular, the sealant of Example 2 is crosslinked by a residence of 28 days in an oven at 23° C. and 50% relative humidity (according to Method A shown in the standard), followed by an alternating cycle of residences in an oven at 70° C. and residences in water at 23° C. (according to Method B shown in the standard).

B.3.2 Tensile Tests on the Joints:

The specimens of joints prepared according to B.3.1. are drawn in a tensile tensing device, the movable jaw of which moves at a constant rate equal to 5.5 mm/minute. The stress applied and the elongation of the test specimen (expressed as %) during the drawing thereof are recorded.

The 100% modulus, corresponding to the stress (in MPa) recorded for an elongation of the joint of 100%, and also the elongation (as %) measured at the breaking of the joint are shown in the table below, for each type of substrate: concrete or aluminium.

B.4 Slump Test:

The degree of slump (or sagging) of a sealant employed in a vertical joint is measured according to standard ASTM D 2202.

An absence of slump of the sealant, i.e. a distance measured on the graduated scale of the appliance of less than 2.5 mm, is observed.

Example 1 (according to the invention): thixotropic composition consisting of a 23.3% weight/weight suspension of bisurea in pentaerythritol tetravalerate Example A is repeated, the DIDP being replaced with pentaerythritol tetravalerate.

A stable 23.3% weight/weight dispersion of the same bisurea is obtained, the Brookfield viscosity of which, measured at 23° C., is 16.7 Pa·s.

Example 2 (according to the invention): adhesive sealant composition based on polyurethane prepolymer comprising —NCO end groups comprising the thixotropic composition of Example 1

Example B is repeated, replacing, during the preparation of the sealant:
- the thixotropic composition of Example A with that of Example 1, and
- the 10% of DIDP with 10% of pentaerythritol tetravalerate.

The results of the tests are shown in the table.

|  | Example B | Example 2 |
|---|---|---|
| Migration of the plasticizer Annular radius (in mm) | between 1 and 2 | <0.5 |
| Flow after extrusion (in g/minute) | 69 | 69 |
| 100% modulus (in MPa) concrete substrate | 0.44 | 0.48 |
| Elongation at break (in %) concrete substrate | 480 | 563 |
| 100% modulus (in MPa) aluminium substrate | 0.41 | 0.46 |
| Elongation at break (in %) aluminium substrate | 213 | 387 |
| Slump distance (in mm) according to ASTM D 2202 | <2.5 | <2.5 |

These results reveal, for the sealant of Example 2, a behaviour in the extrusion during the cartridge application which is identical to that of Example B.

The 100% modulus (which indicates the cohesion of the adhesive joint) and the elongation at break (which corresponds to the elasticity of the adhesive joint) are each improved for Example 2 according to the invention in comparison with the reference Example B, both for concrete substrates and for aluminium substrates.

The invention claimed is:

1. An adhesive sealant composition comprising at least one moisture-crosslinkable prepolymer and, as anti-sagging agent, from 5% to 30% by weight, on the basis of the total weight of said adhesive sealant composition, of a thixotropic composition comprising 10% to 40% by weight of a bisurea a) obtained by reaction of a primary aliphatic amine a1) with a diisocyanate a2), said diisocyanate a2) having a molar mass of less than 500 g/mol, and from 60% to 90% by weight of an ester b) of formula (I):

in which:

$R^1$, $R^2$ and $R^3$, which are identical or different, each represent an oxycarbonylalkyl radical having from 4 to 20 carbon atoms;

$R^4$ represents a hydrogen atom, a methyl or ethyl radical or a radical: —$CH_2$—$R^5$ in which $R^5$ represents an oxycarbonylalkyl radical having from 4 to 20 carbon atoms;

said thixotropic composition being in the form of a suspension of solid particles of bisurea a) in a continuous phase formed by the ester b).

2. The adhesive sealant composition according to claim 1, wherein the amine a1) is an n-alkylamine having 1 to 22 carbon atoms.

3. The adhesive sealant composition according to claim 1, wherein the amine a1) is n-butylamine.

4. The adhesive sealant composition according to claim 1, wherein the diisocyanate a2) has the formula (II):

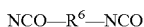

NCO—$R^6$—NCO    (II)

in which $R^6$ is one of the following divalent radicals, the formulae of which show 2 free valencies:

a) the divalent radical derived from isophorone:

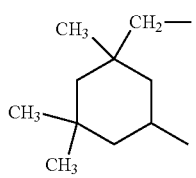

b) the divalent radical 4,4'-methylene-bis(cyclohexyl)

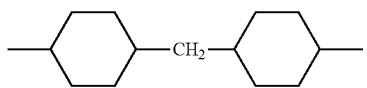

c) the divalent radical derived from toluene 2,4-diisocyanate (or 2,4-TDI) or from toluene 2,6-diisocyanate (or 2,6-TDI) of respective formulae:

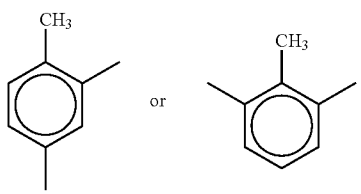

d) the divalent radical derived from 4,2'-diphenylmethylene diisocyanate (or 4,2'-MDI) or from 4,4'-diphenylmethylene diisocyanate (or 4,4'-MDI), of formulae:

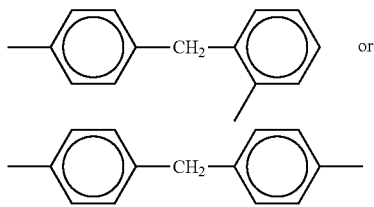

e) —$(CH_2)_6$— (or hexamethylene radical);

f)

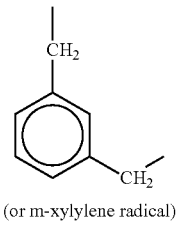

(or m-xylylene radical)

or g)

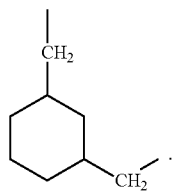

(or hexahydro-m-xylylene radical)

5. The adhesive sealant composition according to claim 1, wherein the diisocyanate a2) is 4,4'-diphenylmethylene diisocyanate.

6. The adhesive sealant composition according to claim 1, wherein the ester b) has the formula (I), in which $R^4$ represents a radical: —$CH_2$—$R^5$.

7. The adhesive sealant composition according to claim 1, wherein the ester b) has the formula (I), in which:
$R^1$, $R^2$ and $R^3$ are identical and each represent an oxycarbonylalkyl radical having 4 or 5 carbon atoms; and $R^4$ represents a radical: —$CH_2$—$R^5$ in which $R^5$ is identical to $R^1$, $R^2$ and $R^3$.

8. The adhesive sealant composition according to claim 1, wherein the ester b) is pentaerythritol tetravalerate.

9. The adhesive sealant composition according to claim 1, comprising:
from 10% to 30% by weight of at least one moisture-crosslinkable prepolymer,
from 20% to 70% by weight of at least one filler,
from 5% to 25% by weight of the thixotropic composition, and
from 0.01% to 1% by weight of at least one crosslinking catalyst,
the percentages by weight being expressed with respect to the total weight of said adhesive composition.

10. The adhesive sealant composition according to claim 1, wherein the moisture-crosslinkable prepolymer is a polyurethane comprising —NCO end groups.

11. The adhesive sealant composition according to claim 1, comprising 5 to 35% by weight, on the basis of the weight of said adhesive sealant composition, of a plasticizer other than ester b).

12. A ready-to-use article comprising the adhesive sealant composition as defined in claim 1, in a hermetic packaging protected from air.

\* \* \* \* \*